United States Patent [19]

Greene, Jr. et al.

[11] Patent Number: 4,715,696

[45] Date of Patent: Dec. 29, 1987

[54] FLEX COUPLINGS ISOLATE STABILIZING MIRRORS

[76] Inventors: Orville T. Greene, Jr., 1 Marla Ct., Stafford, Va. 22554; John A. Mead, 506 Tree Top Dr., Apt. 102, Virginia Beach, Va. 23451

[21] Appl. No.: 881,113

[22] Filed: Jul. 1, 1986

[51] Int. Cl.$^4$ .................... G02B 27/64; G02B 23/00
[52] U.S. Cl. .................................................. 350/500
[58] Field of Search .............................. 350/500, 545

[56] References Cited

U.S. PATENT DOCUMENTS

| | | | |
|---|---|---|---|
| 3,582,180 | 1/1971 | Gross | 350/500 |
| 3,591,250 | 7/1971 | Feinstein et al. | 350/500 |
| 4,155,621 | 5/1979 | Mead | 350/500 |
| 4,465,346 | 8/1984 | Fraser | 350/500 |

FOREIGN PATENT DOCUMENTS 1386114 12/1964 France ................ 350/500

Primary Examiner—Jon W. Henry

[57] ABSTRACT

Duplicate mirrors stabilizing both axes in a binocular are coupled together through spring ribbons which enable their combined inertia to be driven by a relatively small gyroscope without hesitation or overshoot. Dimensions, material, treatment, and surface coatings for these spring ribbon couplings are engineered to coact with the mirror pivot supports, with the drive crank from the gyroscope, and with each other in a manner to repel visible vibration.

7 Claims, 7 Drawing Figures

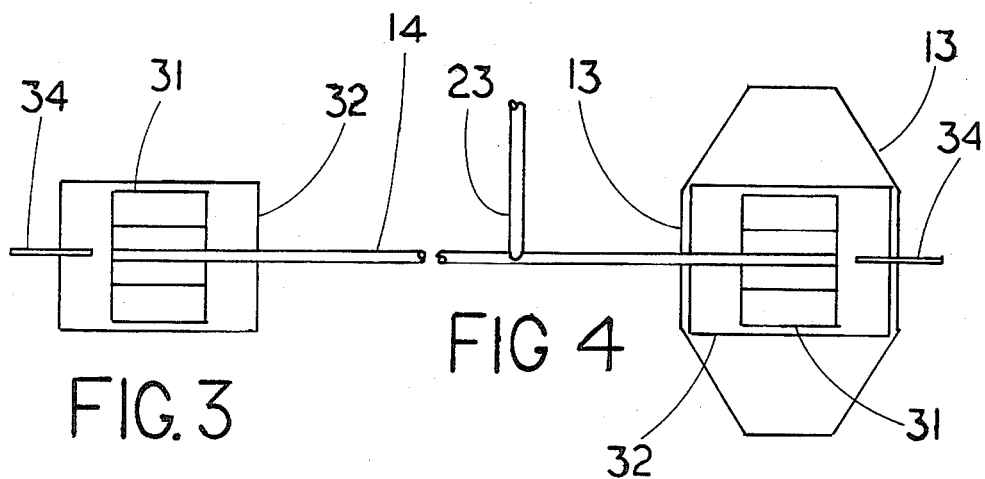
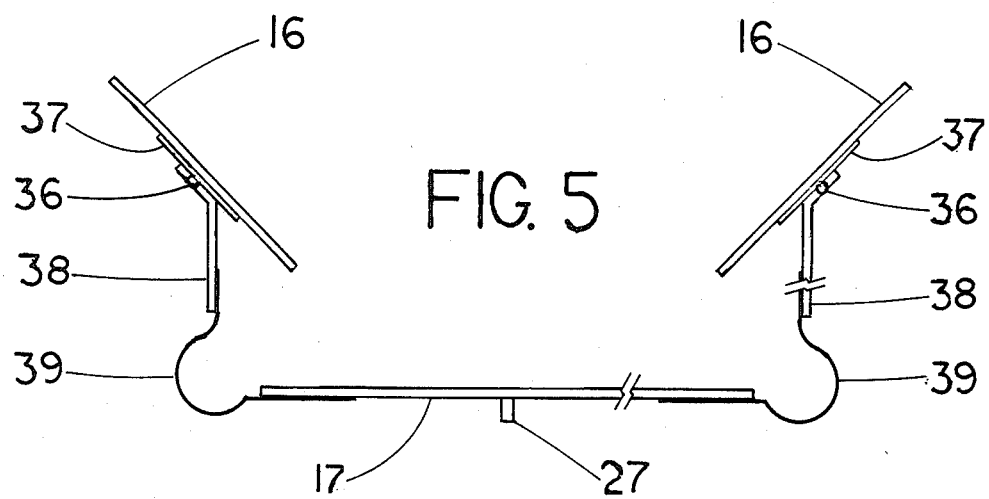
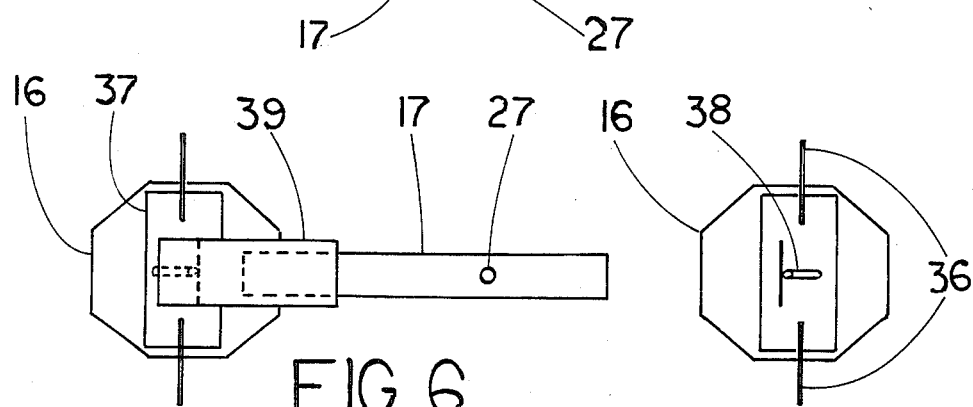

though the inertia of the two mirrors for either axis combined with this spring to produce a simple vibrating system. The resulting tendency toward vibration caused the image to jump and overshoot at the start of each frame disturbance.

SUMMARY AND OBJECTS

The mechanical layout for this binocular configuration, including the arrangement of gyroscopes and their output linkages, is original. Its practical success depends on devising hardware that will dispel internally excited mirror oscillations in a manner described by the present invention. The need for this hardware is, therefore, special and has little, if any, precedent.

The task undertaken herein is to separate mirror inertias of either axis in their tendency to vibrate, while maintaining unison in visual movement. Not only must the mirror inertias be decoupled, but also their inclination to oscillate must be dampened or otherwise discouraged. A principal object of this invention is to confound the simple vibrating system comprising support spring wires and mirror inertias with the addition in series of more springs in the form of flex ribbon couplings to be described. Experiments showed that separate springs or flex couplings installed between each mirror and its next supporting member would basicly serve the purpose. Further testing demonstrated that these couplings must be fashioned of thin, wide flat stock; which led to the added connotation of ribbon. In the case of the yaw linkage, the spring effect of its flex couplings must be figured in as part of the whole recovery rate.

The objects to be achieved in the subject invention for ribbon flex couplings include:
1. To diverge natural frequencies and thereby to partially neutralize mirror oscillation.
2. To dampen and adsorb energy from mirror oscillation.
3. To shape linkage members for resisting torsion about the two axes other than the one being stabilized.
4. To discourage vibration in and along connecting bars.
5. To minimize deadspot in the stabilizing drive network.

DESCRIPTION OF THE DRAWINGS

FIGS. 2 through 4 depict flex couplings for pitch.

FIG. 2 is an end view of the pitch connecting bar, showing a mirror with its flex coupling.

FIG. 3 shows a flex coupling attached to a mirror back piece at the left end of the pitch connecting bar.

FIG. 4 shows the right end of FIG. 3 with mirror mounted.

FIGS. 5 through 7 depict flex couplings for yaw.

FIG. 5 is a top view of the yaw stabilizing mirror linkage.

FIG. 6 is a plan view, looking rearward, of the left side of the yaw linkage.

FIG. 7 is a view of the right side of FIG. 6 with a portion cut away as shown in FIG. 5.

DESCRIPTION OF PREFERRED EMBODIMENTS

Figure 1:
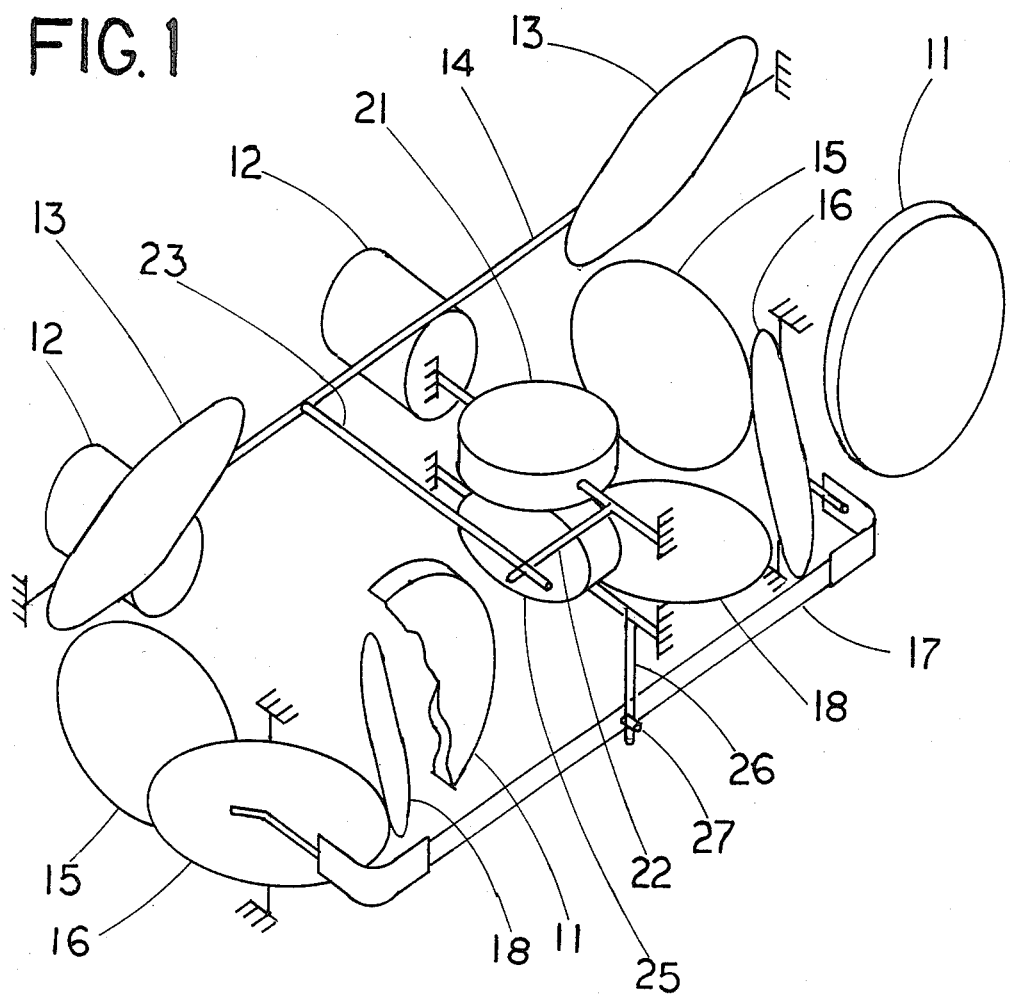
FIG. 1 is an isometric layout of the image stabilizing binocular arrangement, its optical components, pivots, and linkages.

The subject flex couplings were developed expressly for a particular layout of image stabilizing binocular components. Accordingly, at the outset of this description, FIG. 1 is presented in three dimensions to show this arrangement. Spring wire pivots, two for pitch and four for yaw, are shown with one end of each secured to a mirror subassembly. The other end of each wire is shown in schematic fashion secured to the ground or frame. Shafts are pictured extending from two sides of each gyroscope which terminate also in attachment to ground. These shafts define precession or gimbal axes and are joined to the frame through precision bearings that are not shown.

Objective lenses 11 are located high on the instrument frame at its front which is down and to the right in FIG. 1. Eyepieces 12 are located low on the frame rear. After entering through objectives 11, the light path on either side proceeds to rotatable pitch mirrors 13, which are tied together through pitch bar 14; reflects therefrom to fixed mirrors 15; reflects therefrom to yaw mirrors 16, which rotate together through a parallel linkage having a common connecting bar 17; reflects therefrom to fixed mirrors 18; and finally exits through eyepieces 12, When the frame suffers a pitch disturbance, the pitch gyroscope 21 precesses by rotating about its gimbal axis with its crank 22 which terminates in a loop of wire that slides over and actuates the solid lever 23 whose other end is secured to bar 14. Gyroscope 21 thus rotates mirrors 13 through the proper angle in pitch to restore the line-of-sight to its previous direction in space. In a similar manner, the yaw gyroscope 25 below rotates crank 26 to translate bar 17 through pin lever 27 to stabilize yaw mirrors 16.

Figure 2:
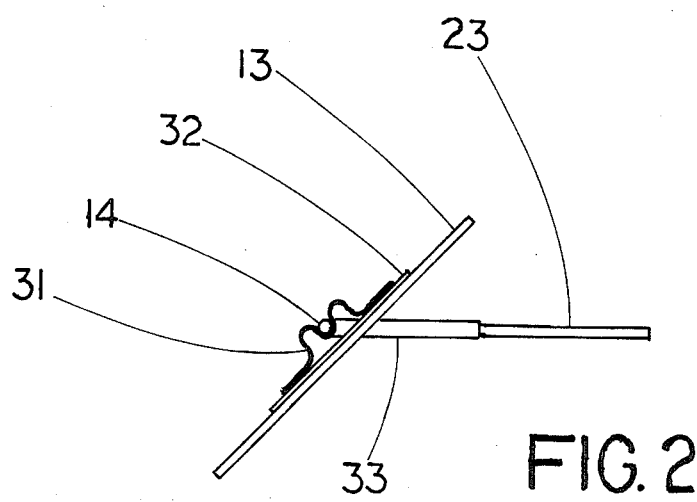

A ribbon flex coupling is installed between each end of connecting bar 14 and each pitch mirror 13 as delineated in FIG. 2 which is drawn from the left on FIG. 1 at a section through the middle of left mirror 13. The axis about which the mirror is stabilizing is perpendicular to the paper. Flex coupling 31 is soldered at its middle to bar 14 and to mirror backing 32 at its flanges. Bar 14 was made from 0.093 dia.×0.016 wall brass tubing and backing 32 is 0.031 thick steel sheet. Mirrors 13 are free to flex relative to bar 14 through the curls of 31 at both ends of 14. Flex couplings for the first working model were fashioned according to this configuration from 0.003 beryllium copper with curls having an active diameter of 0.16 inch. Secured to and coming off to the right from bar 14 in FIG. 2 is seen the pitch lever 23. This lever consists of a brass tube 33 shaped and soldered to bar 14 at one end and joined to a nylatron rod at its other end for a 1⅛ inch extension which is actuated by pitch gyroscope crank 22.

FIGS. 3 and 4 depict the back side of the pitch mirrors' subassembly as viewed from the upper left of FIG. 1. In order to show the assembly of pieces FIG. 3 pictures the four parts that are soldered together first. Backing 32 is steel to facilitate soldering and because it has a coefficient of thermal expansion compatible to that of glass. Two backings 32 are soldered to flex couplings 31 at the latters' lateral center and to spring wire pivots 34 as shown in FIGS. 3 and 4 together. Then, with backings 31 held in the same plane, connecting bar 14 is soldered in to place, taking care that the joint is effectively centered on the width of the couplings. Lever 23 is shown in place, but need not be soldered on until later. Mirrors 13 are cemented in to place to a convenient time much later in the assembly procedure. The outboard ends of the 0.014 diameter wire pivots are secured to brackets on the frame (not shown) leaving an active length of approximately three sixteenths inch. These spring wire pivots not only support the mirrors, but also control the rate with which the line-of-sight recovers to frame zero. Flex couplings 31 are substantially stiffer than the wire pivots but are designed to have a natural frequency with the mirrors that is close to a multiple of the system comprising the wires alone.

The yaw stabilizing linkage dirves two mirrors 16 on axes that are perpendicular to the paper in FIG. 5. The spring wire pivots which define these axes are shown as dots 36. As in the case of the pitch mirrors described for FIGS. 3 and 4, steel mirror backing pieces 37 are used as common members to which 0.011 diameter wire pivots and 0.050 diameter soft steel link rods 38 are soldered as pictured in FIG. 5. Also shown are two flex ribbon couplings 39 whose one end is soldered to rods 38 and whose other end is attached to connecting bar 17 which carries nylatron pin lever 27 for actuation by yaw gyroscope crank 26. Yaw mirrors 16 are cemented in to place later in the assembly.

FIGS. 6 and 7 comprise a plan view of the yaw linkage of FIG. 5 as seen from the instrument front. FIG. 7 is shown without the portion isolated in FIG. 5 so that a section of coupling 39 and one of link rod 38 can be seen from this angle. For a full picture of the pieces which work together to stabilize in yaw, reference is directed to FIGS. 1 and 5 as well as to 6 and 7. The yaw linkage is different in that the spring effect of its flex coupling 39 contributes to the recovery rate. This must be worked into the flex coupling design for this axis. The problem is alleviated by the fact that the yaw mirrors are supported by separate sets of wire pivots, which allows more freedom in the choice of their individual diameters.

The subject ribbon flex couplings are designed to incorporate several features. Firstly, the couplings for both axes are made from stock which is thin, has large flex radius, and has slightly different thicknesses in each pair. These characteristics produce a low spring constant that gives a natural frequency for each coupling with its mirror which is different from each other and is a small multiple, or close thereto, of that for the previous system comprising wire pivots and supported inertia. These design criteria help neutralize the natural tendency of the previous system to vibrate.

Secondly, the subject coupling pieces can be made wide and incorporate a plastic rubber coating on their active spring portions. These expedients will absorb some of the energy transmitted in motion and dampen the action.

Thirdly, the width of the couplings must be calculated for sufficient stiffness about the two axes other than the one intended to flex.

As a fourth feature, vibration waves in and travelling along the connecting bar of both pitch and yaw need to be discouraged. This is accomplished with a close sliding fit of the gyroscope crank over the lever that rotates the mirrors so the massive steadiness of the gyroscope assembly can be transferred toward the mirrors.

A fifth feature constitutes the use of spring ribbon or shim stock having a high modulus of elasticity for low hysteresis. This expedient will allow flex couplings to return with very little dead spot. The goals enumerated as objects of this invention are thus realized in the solutions which have just been described.

The foregoing is not intended to prejudice that purpose of a patent which is to cover each new inventive concept therein no matter how others may later disguise it by variations or additions. For instance, the spring curls in the flex couplings between attachment to connecting bar and to mirror may assume a different shape than that pictured thus far. Indeed, the pieces to which they are attached may undergo important alterations.

We claim:

1. In an image stabilizing binocular with two pitch mirrors carried in line on a common bar whose outboard extremities are attached to the frame through pivot wires defining a pitch axis about which said mirrors compensate the line-of-sight for frame oscillation with rotation through a linkage by a relatively small single-degree-of-freedom gyroscope, the inclusion of spring ribbon couplings to connect said mirrors to said common bar; each said coupling, with its width parallel to pitch, being fastened to said common bar along its length near its middle and to the back side of one mirror near both its ends, leaving curled portions of its length free to isolate said mirrors from visible vibration.

2. In an image stabilizing binocular with two yaw mirrors carried on parallel but displaced sets of frame-mounted spring wire pivots defining a yaw axis about which said yaw mirrors compensate the line-of-sight for frame oscillation with translation of a common link by a relatively small single-degree-of-freedom gyroscope, the inclusion of spring ribbon couplings to connect said mirrors to said common link in a parallelogram; each said coupling, with its width parallel to yaw, being fastened to said common link along its length near one end and to the back side of one of said yaw mirrors near its other end, leaving a bend of approximately ninety degrees near its middle for pivoting while isolating said mirrors from visible vibration.

3. In an image stabilizer as set forth in claim 1 or 2, the fabrication of said ribbon couplings from flat stock which is relatively thin to ensure their spring constant is low enough to partially neutralize the natural oscillation of said mirrors.

4. In an image stabilizer as set forth in claim 1 or 2, the fabrication of said ribbon couplings from flat stock which is sufficiently long to permit large radius curves between attachment points from said bars to said mirrors to ensure their spring constant is low enough to partially neutralize the natural oscillation of said mirrors.

5. In an image stabilizer as set forth in claim 1 or 2, the fabrication of said ribbon couplings from flat stock which is relatively wide to resist torsion about the two axes other than the one being stabilized.

6. In an image stabilizer as set forth in claim 1 or 2, the fabrication of one said spring ribbon coupling from flat stock which differs in thickness by approximately seventeen percent from the thickness of the other to diverge sympathetic frequencies of said mirrors.

7. In an image stabilizer as set forth in claim 1 or 2, the coating of active portions of the pivoting curl of said ribbon couplings with plastic rubber to dampen vibration by absorbing some of the energy therefrom.

* * * * *